(12) United States Patent
Malovec et al.

(10) Patent No.: US 10,348,152 B2
(45) Date of Patent: Jul. 9, 2019

(54) DYNAMO FOR AN INTERNAL COMBUSTION ENGINE

(71) Applicant: Mahle International GmbH, Stuttgart (DE)

(72) Inventors: Simon Malovec, Vremski Britof (SI); Mitja Berce, Ajdovscina (SI)

(73) Assignee: Mahle International GmbH (DE)

( * ) Notice: Subject to any disclaimer, the term of this patent is extended or adjusted under 35 U.S.C. 154(b) by 67 days.

(21) Appl. No.: 15/784,593

(22) Filed: Oct. 16, 2017

(65) Prior Publication Data

US 2018/0109159 A1    Apr. 19, 2018

(30) Foreign Application Priority Data

Oct. 17, 2016   (EP) .................................. 16194193

(51) Int. Cl.
*H02K 9/00* (2006.01)
*H02K 5/20* (2006.01)
(Continued)

(52) U.S. Cl.
CPC ................. *H02K 5/20* (2013.01); *H02K 9/06* (2013.01); *F02B 67/06* (2013.01); *H02K 11/046* (2013.01)

(58) Field of Classification Search
CPC ........... H02K 5/20; H02K 9/06; H02K 11/046
(Continued)

(56) References Cited

U.S. PATENT DOCUMENTS 4,492,885 A * 1/1985 Kitamura ................. H02K 9/06
310/62

2012/0306300 A1 * 12/2012 Ishikawa ............... H02K 11/048
310/62
2014/0097715 A1 * 4/2014 Hall ........................ H02K 5/18
310/59

FOREIGN PATENT DOCUMENTS

CN          2577496 Y      10/2003
EP          2 194 633 A1    6/2010
(Continued)

OTHER PUBLICATIONS

English abstract for CN-2 577 496.
English abstract for JP-2001 211608.

*Primary Examiner* — Thanh Lam
(74) *Attorney, Agent, or Firm* — Fishman Stewart PLLC

(57) ABSTRACT

An electric generator may include a housing having a housing casing running around in a circumferential direction and front and rear side walls, a radially outer stator rotatably arranged on the housing about an axis of rotation, and a radially inner rotor arranged on the housing in a rotationally fixed manner. The generator may also have an axially outer impeller wheel arranged on an outer side of the front side wall and arranged in a rotationally fixed fashion on the rotor. The generator may further have a primary air inlet having inlet openings formed in the rear side wall, a secondary air inlet having secondary inlet openings formed in the housing casing, an air outlet having a plurality of outlet openings formed in the front side wall, a primary air path from the primary air inlet to the air outlet, and a secondary air path from the secondary air inlet to the air outlet. During operation, the impeller wheel may rotate with the rotor and generate a partial vacuum that generates a primary air flow, which enters the primary air inlet, follows the primary air path, and exits through the air outlet, and a secondary air flow, which enters through the secondary air inlet, follows the secondary air path, and exits through the air outlet.

21 Claims, 7 Drawing Sheets

(51) Int. Cl.
*H02K 9/06* (2006.01)
*F02B 67/06* (2006.01)
*H02K 11/04* (2016.01)

(58) Field of Classification Search
USPC ........................................ 310/52, 59, 62, 63
See application file for complete search history.

(56) References Cited

FOREIGN PATENT DOCUMENTS

GB          2318458  A    4/1998
JP       2001 211608 A    8/2001

\* cited by examiner

DYNAMO FOR AN INTERNAL COMBUSTION ENGINE

CROSS REFERENCE TO RELATED APPLICATIONS

This application claims priority to European Patent Application No. EP 16194193.5, filed on Oct. 17, 2016, which is hereby incorporated by reference in its entirety.

TECHNICAL FIELD

The present invention relates to an electric generator, preferably an alternating current generator or alternator, in particular a dynamo for an internal combustion engine which is arranged, for example, in a vehicle.

BACKGROUND

An electric generator which can be used as a dynamo in an internal combustion engine usually comprises a radially outer stator, a radially inner rotor and a housing on which the rotor is arranged so as to be rotatable about a rotatable axis, on which the stator is arranged in a rotationally fixed fashion and which has a housing casing which runs around in the circumferential direction, a front side wall and a rear side wall. During the operation of the generator, the conversion of mechanical work into electrical energy also generates heat which has to be carried away from the generator in order to be able to meet the specifications for the durability of the generator. For this purpose, the generator can be equipped with an axially outer impeller wheel which is arranged on an outer side facing axially away from the rear side wall, of the front side wall in a rotationally fixed fashion on the rotor. In order then to be able to bring about a throughflow through the generator in order to be able to take up and carry away heat during the operation of the generator, a primary air inlet can also be provided, said primary air inlet having a plurality of, preferably axial, primary inlet openings which are formed in the rear side wall. Furthermore, an air outlet can be provided which has a plurality of, preferably axial, outlet openings formed in the front side wall. As a result, a primary air path is formed which leads inside the housing from the primary air inlet to the air outlet. During the operation of the generator, the impeller wheel rotates with the rotor and in doing so generates a partial vacuum at the outer side of the front side wall, in the region of the outlet openings. This partial vacuum then itself generates a primary air flow which enters the housing through the primary air inlet, follows the primary air path in the interior of the housing, and exits again from the housing through the air outlet. The primary air flow expediently flows around the rotor along the primary air path, as a result of which heat can be intensively carried away from the rotor.

Increasing power demands for the generator can give rise to increased generation of heat, with the result that solutions are sought for carrying away the heat better from the generator. Higher power demands can, however, also lead to a situation in which, apart from the rotor, the components of the generator are also subjected to higher temperatures, which affects the service life of the generator. For example, a front rotor bearing can also be subjected to high thermal loading. The front rotor bearing is located in the front side wall. The stator or a stator winding can also be subjected to increased thermal loading.

SUMMARY

The present invention is concerned with the problem of specifying for a generator of the type mentioned at the beginning an improved embodiment which is distinguished, in particular, by improved cooling and by improved carrying away of heat.

This problem is solved according to the invention by means of the subject matter of the independent claim. Advantageous embodiments are the subject matter of the dependent claims.

The invention is based on the general concept of providing on the housing casing a secondary air inlet which has a plurality of secondary air inlet openings formed in the housing casing. By using the secondary air inlet, a secondary air path is formed in the housing, which secondary air path leads within the housing from the secondary air inlet to the air outlet. In other words, the secondary air path leads, like the primary air path, to the air outlet, with the result that the air outlet is provided jointly for the primary air path and for the secondary air path. During operation of the generator, the partial vacuum generated by the rotating impeller wheel generates, in addition to the primary air flow, a secondary air flow which enters the housing through the secondary air inlet, follows the secondary air path within the housing and exits the housing through the air outlet. By using the secondary air inlet, the location of air entering into the housing and the distribution of air and air flow, respectively, within the housing can be enhanced significantly, which brings about improved take up of heat and carrying away of heat and therefore improved cooling of the generator. Since the secondary air flow is also introduced, as it were radially, into the housing through the housing casing, the cooling effect, in particular for the front side wall and as a result, in particular, for the front rotor bearing, is improved. Furthermore, given corresponding positioning of the secondary inlet openings on the housing casing, that is to say radially between the front side wall and the rear side wall, an improved cooling effect at the stator or at a stator winding can also be implemented by the secondary air flow, since the secondary air flow is, in particular, not heated, or only heated slightly, by the rotor and therefore can take up more heat, e.g. from the stator. When the secondary air inlet is adapted for cooling the stator and/or the rotor, the same is true for the improved cooling effect for the stator and/or rotor, since the cooling air following the secondary air path is at the position of the stator and/or rotor cooler than the cooling air following the primary air path. This is due to the fact that the primary air inlet is arranged in the rear side wall where usually components of a power electronic and/or of an electronic control device are arranged. Thus the cooling air following the primary air path serves first to cool said components and second or later to cool the stator and/or the rotor. Therefore, when arriving at the stator and/or rotor this primary cooling air has a higher temperature level than the secondary cooling air following the secondary air path which starts behind or after said components.

The terms "primary air inlet" and "secondary air inlet" shall not indicate different flow rates through the respective inlet during operation of the generator. The flow rates can be of different size. The flow rate through the primary air inlet can be greater or smaller than the flow rate through the secondary air inlet. Also the flow rates through the primary air inlet and through the secondary air inlet can be of the same size.

According to a preferred embodiment the respective secondary air inlet can be adapted in such a way that cooling air is guided directly to a front winding end of a stator winding. Such a front winding end projects axially from a stator ring supporting the stator winding. The front winding end faces the front side wall of the housing. To this end the respective secondary air inlet openings can in particular be adapted or arranged in order to guide air to said front winding end of the stator winding. Alternatively or additionally, the respective secondary air inlet can be adapted in such a way that cooling air is guided directly to a rear winding end of a stator winding. Such a rear winding end projects axially from a stator ring supporting the stator winding. The rear winding end faces the rear side wall of the housing. To this end the respective secondary air inlet openings can in particular be adapted or arranged in order to guide air to said rear winding end of the stator winding. In general, the secondary air path leads from the respective secondary air inlet to the front and/or rear winding end of the stator winding.

Correspondingly, in accordance with one particularly advantageous embodiment, the respective secondary inlet opening can have a radially outer inlet end and a radially inner outlet end. Here, the outlet end is arranged offset axially with respect to the inlet end in the direction of the front side wall. As a result of this configuration of the respective secondary inlet opening, the secondary air flow cannot flow directly radially from the surroundings into the interior of the housing but instead must be deflected at least once for this purpose. This has the advantage that disruptive impurities such as dust, mud, snow, ice and water, cannot penetrate from the surroundings into the interior of the housing directly through the secondary inlet openings. As a result, sufficient protection of the generator against impurities from the surroundings is achieved.

According to a preferred embodiment said outer inlet end can be aligned axially such that the primary air flow enters the respective secondary inlet opening essentially in the axial direction. Furthermore, said inner outlet end can be aligned radially such that the primary air flow enters an interior of the housing in the axial and radial direction or essentially in the radial direction.

Preferred is an embodiment, in which the respective secondary air inlet opening defines a channel which extends at least partially parallel to the axis of rotation of the rotor. Additionally or alternatively, the respective secondary air inlet opening forms a curve in the range of 80° to 100°, and/or the respective secondary air inlet opening has an outer inlet end which is inclined in the range of 80° to 100°, preferably inclined essentially by 90°, to the inner outlet end.

Another advantageous embodiment is characterized in that the respective secondary air inlet opening has an outer inlet end which is open only in the axial direction.

In one advantageous embodiment, the stator can have a stator ring and a stator winding. The stator ring is preferably ferromagnetic and can be formed, for example, by means of axially stacked rings made of yoke metal. The stator winding can be configured with multiple poles in the customary way.

The housing can also have a front side pot which has a pot wall running around in the circumferential direction and a pot floor which bounds the front side pot axially on one side. The pot floor of the front side pot forms the front side wall of the housing. The pot wall of the front side pot forms a front longitudinal section of the housing casing. In addition, the housing can have a rear side pot which has a pot wall which runs around in the circumferential direction and a pot floor which bounds the rear side pot axially on one side. The pot floor of the rear side pot forms the rear side wall. The pot wall of the rear side pot forms a rear longitudinal section of the housing casing. The stator ring is then connected to the front side pot and to the rear side pot. The electric motor can be mounted particularly easily by means of the proposed design.

According to one advantageous development, the stator ring can form a central longitudinal section of the housing casing axially between the front side pot and the rear side pot, with the result that the stator ring is also subjected directly to the surroundings. In the preferred case, the housing is formed exclusively by the front side pot, the rear side pot and by the stator ring. The housing casing is then preferably formed only by the front longitudinal section, the central longitudinal section and the rear longitudinal section.

This design is distinguished, on the one hand, by a simple mounting and, on the other hand, by improved thermal irradiation of the stator into the surroundings via the stator ring. For example, the front side pot can be screwed axially to the rear side pot, as a result of which the stator ring is clamped in axially between the front side pot and the rear side pot and as a result can be secured sufficiently. The stator is therefore secured axially to the housing between the front side pot and the rear side pot by the clamping of the stator ring.

Basically, at least one such secondary inlet opening can be formed on the stator ring. As a result, the carrying away of heat at the stator can be significantly improved.

In a preferred embodiment the respective secondary air inlet opening is radially limited to the outside by the front side pot and is radially limited to the inside by the stator ring. Additionally, or alternatively, the respective secondary air inlet opening defines a channel which extends partially or completely between the front side pot and the stator ring.

However, at least one such secondary inlet opening is preferably formed on the front side pot. In this way, the cooling or the carrying away of heat in the interior of the housing can be improved in the interior of the housing, in a region assigned to the front longitudinal section of the housing casing. In particular, the front side wall and in particular the front rotor bearing specified above can therefore be cooled better. The respective secondary air inlet opening can be realized by means of a depression which axially overlaps a portion of the central longitudinal section.

According to an advantageous development, the respective secondary inlet opening which is formed on the front side pot can be formed by a radial depression on a radial inner side of the pot wall of the front side pot. This depression can expediently extend here axially as far as into a front-side edge, facing away from the front side wall, of the pot wall. In other words, the inlet end of this secondary inlet opening is located axially on this edge of the pot wall on the front side pot. The secondary inlet openings which are generated using the depression can be influenced particularly easily and therefore economically. In particular, for this purpose the front side pot does not have to be reconstructed in a costly fashion. For example, the front side pot can be a cast part, with the result that the depressions on the inner side of the pot wall can be implemented particularly easily by means of corresponding adaptation of the casting mould. The axial extent of the respective depression is expediently selected in such a way that a radially outer edge of a front side, facing the front side wall, of the stator ring is located axially between the inlet end and the outlet end of the respective secondary inlet opening. The depression therefore leads axially past this front edge by means of which the axial and radial support of the stator ring on the front side pot takes place.

According to a preferred embodiment said radial depression forms at said front-side edge an axially aligned outer inlet end of the respective secondary inlet opening.

In one development, the respective depression can have, spaced apart axially from the front-side edge of the pot wall, a ramp which rises towards the inner side of the pot wall. The ramp brings about deflection of the secondary air flow which flows axially from the inlet end up to the ramp and is deflected radially at the ramp. As a result, the flow resistance of the secondary air inlet opening can be reduced, which increases the efficiency of the cooling.

Additionally or alternatively, at least one such secondary inlet opening can be formed on the rear side pot. In this case, the cooling can be improved by means of a relatively large longitudinal section of the housing casing in the interior of the housing.

For example, the respective secondary inlet opening, which is formed on the rear side pot, can have an inlet end, which is open axially towards the rear side wall on a radial outer side of the pot wall of the rear side pot. Furthermore, the respective secondary inlet opening which is formed on the rear side pot can have an outlet end which is radially open towards the interior of the housing. Therefore, axial flowing into the secondary inlet opening and radial flowing out of the secondary inlet opening also occur here. These secondary inlet openings can also be integrated comparatively easily into the rear side pot, in particular if the rear side pot is a cast part.

According to a preferred embodiment the respective secondary inlet opening forms a channel guiding air from the inlet end to the outlet end. Said channel has an axially extending inlet portion and a radially extending outlet portion. Said inlet portion of the channel fluidly connects the inlet end to the outlet portion of the channel and extends at the outer side of the pot wall, while the outlet portion of the channel fluidly connects the inlet portion of the channel with the outlet end and radially penetrates the pot wall. Preferably, the respective secondary inlet opening comprises a cover at the outer side of the pot wall, wherein said cover radially covers the inlet portion of the channel.

The respective outlet end can be spaced apart axially from the front-side edge of the pot wall of the rear side pot. The secondary inlet openings of the rear side pot are therefore configured completely within the pot wall of the rear side pot in axial direction. Furthermore, this positioning permits selective flow against the stator winding to be implemented.

It is also possible to provide that the respective inlet end is spaced apart axially from the rear side wall. This measure also improves the positioning of the respective secondary inlet opening with the objective of improved flow against the stator winding.

In another embodiment, the primary air inlet can be formed exclusively by the primary inlet openings which are formed in the rear side wall and are preferably embodied as axial through-openings. Radial and/or natural-face-side primary air inlet openings are then not present. As a result, the formation of an efficient axial through-flow for the primary air flow is improved.

According to one preferred embodiment, the air inlet can be formed exclusively by the outlet openings formed in the front side wall. The outlet openings are also preferably embodied as axial through-openings. Radial and/or natural-face-side outlet openings are then not present. The implementation of the air outlet exclusively using the outlet openings formed in the front side wall gives rise to improved cooling of the front side wall and therefore, in particular, of the front rotary bearing.

In another embodiment, the secondary air inlet can be formed exclusively by the secondary inlet openings formed in the housing casing. Axial and/or wall-side secondary inlet openings are then not present. As a result, the formation of a defined secondary air flow can be improved.

Another embodiment provides that a plurality of, or all of, the secondary inlet openings are arranged distributed in the circumferential direction. In this context, basically distribution which is uniform in the circumferential direction is possible. However, distribution of the secondary inlet openings which is non-uniform in the circumferential direction is preferred. In this way, in particular the distribution of the secondary inlet openings can be improved according to demand. It is also conceivable to dimension the secondary inlet openings differently. In particular, at least two secondary inlet openings can differ from one another in terms of their dimensions in the circumferential direction.

In another embodiment, the rotor can have a rotor shaft which is mounted in a front rotor bearing on the front side wall and is guided axially through the front side wall. The rotor shaft can also be mounted on a rear rotor bearing on the rear side wall. Additionally or alternatively, the impeller wheel can be connected in a rotationally fixed fashion to a rotor shaft of the rotor, axially between the front side wall and a drive element. The drive element, which is preferably a belt wheel or a gear wheel, is also connected in rotationally fixed fashion to the rotor shaft.

Preferably, the impeller wheel, which is arranged at the front side wall and driven by the rotor, is the only impeller wheel of the generator. Thus the generator has only a single cooling fan, namely the impeller wheel.

In present context, the terms "axial direction", "radial direction" and "circumferential direction" refer to the rotational axis of the rotor. The rotational axis defines the axial direction. The axial direction extends parallel to the rotational axis. The radial direction extends perpendicularly to the axial direction. The circumferential direction runs around the rotational axis.

Further important features and advantages of the invention can be found in the dependent claims, the drawings and the associated description of the figures with reference to the drawings.

Of course, the features mentioned above and those which are still to be explained below can be used not only in the respectively specified combinations but also in other combinations or alone without departing from the scope of the present invention.

Preferred exemplary embodiments of the invention are illustrated in the drawings and are explained in more detail in the following description, wherein identical reference symbols denote identical or similar or functionally identical components.

BRIEF DESCRIPTION OF THE DRAWINGS

In the drawings, in each case in schematic form.

DETAILED DESCRIPTION

Figure 1:
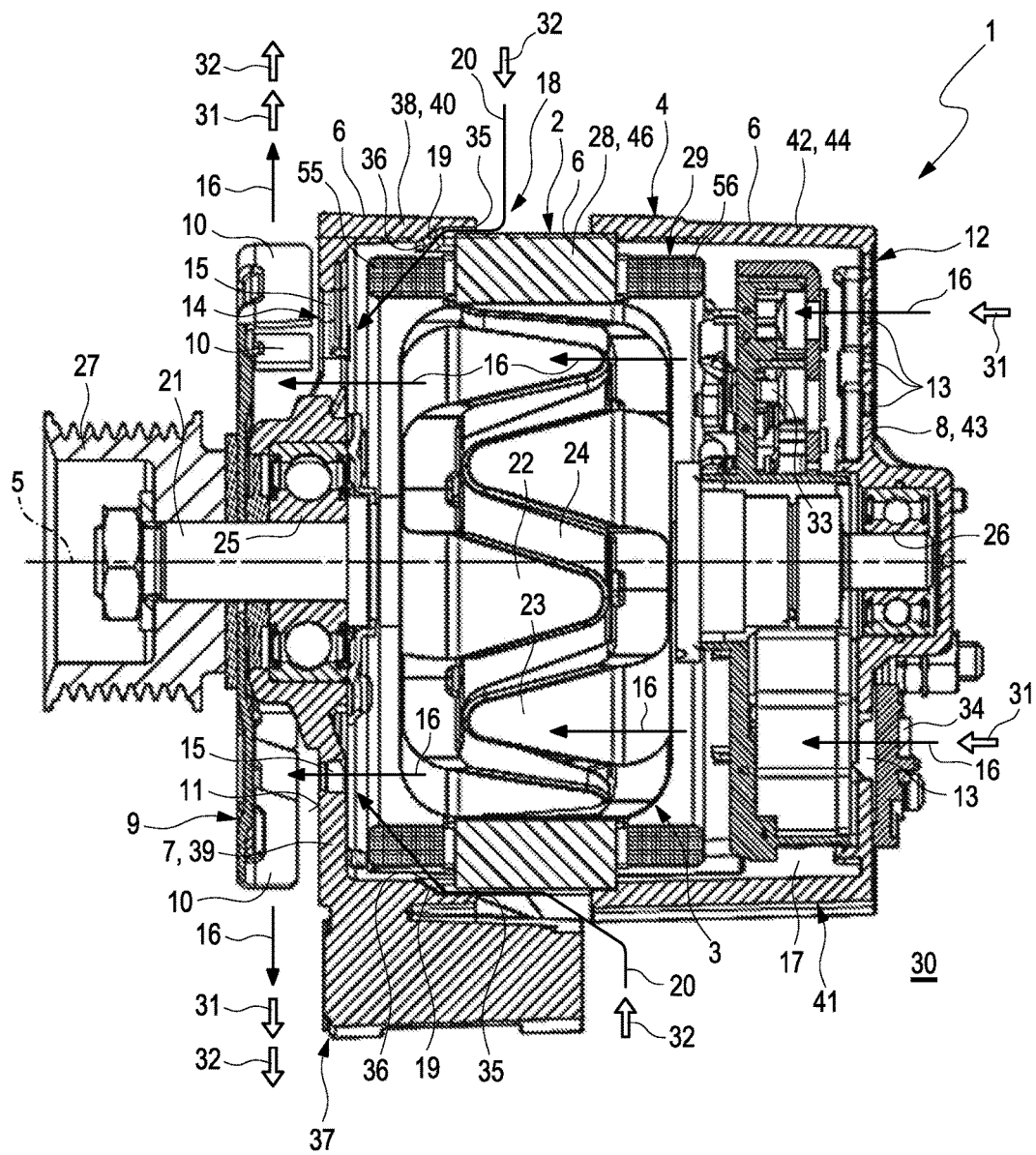
FIG. 1 shows an axial section through an electric generator according to a first embodiment.
Figure 2:
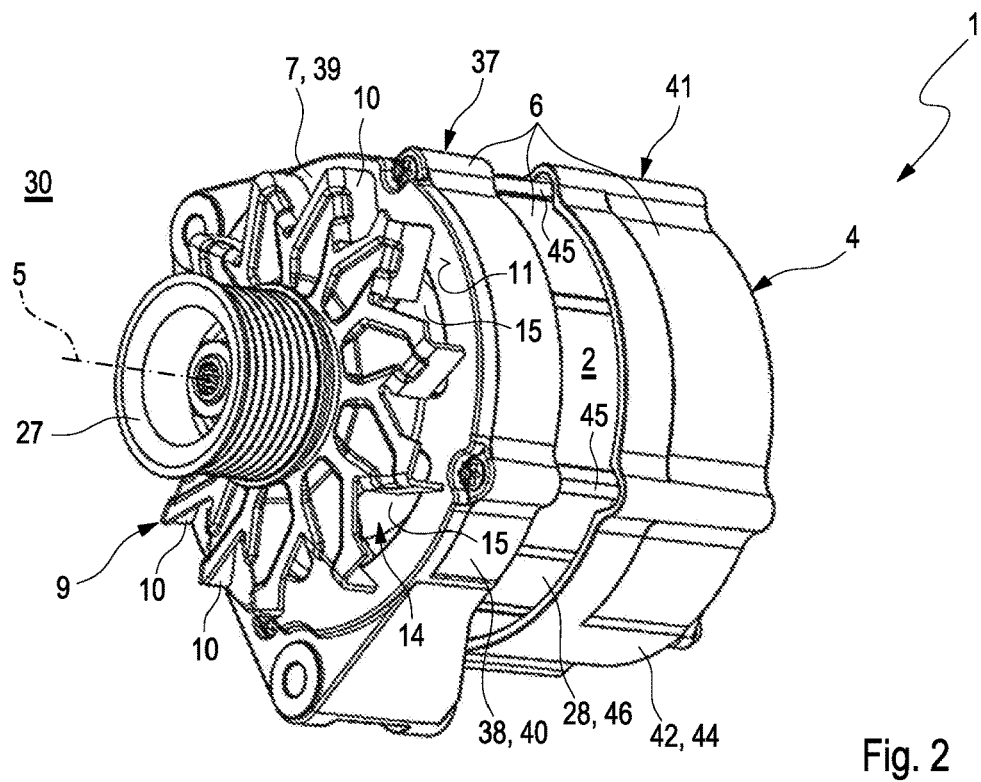
FIGS. 2 and 3 show isometric views of the generator from FIG. 1 in different viewing directions.
Figure 3:
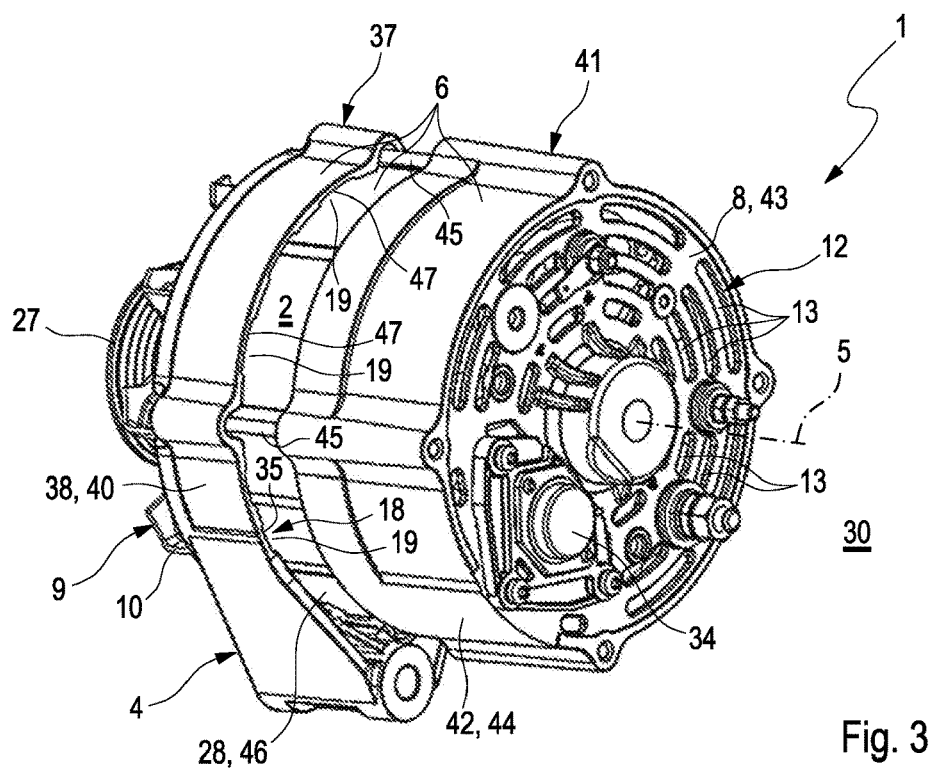

In accordance with FIGS. 1 to 3, 6 to 8 and 11, an electric generator 1, which is preferably an alternating current generator and in particular a dynamo for an internal combustion engine, preferably in a motor vehicle, comprises a radially outer stator 2, a radially inner rotor 3 and a housing 4. In this respect, the generator 1 is an internal rotor. The rotor 3 is arranged on the housing 4 so as to be rotatable about a rotational axis 5. The stator 2 is arranged in a rotationally fixed fashion on the housing 4. The housing 4 has a housing casing 6 which runs around in the circumferential direction, a front side wall 7 and a rear side wall 8.

The generator 1 also has an axially outer impeller wheel 9 which has a plurality of blades 10. The impeller wheel 9 is attached in a rotationally fixed fashion to the rotor 3 and at the same time is arranged on an outer side 11, facing axially away from the rear side wall 8, of the front side wall 7. In addition, a primary air inlet 12 is provided which has a plurality of primary inlet openings 13 which are formed in the rear side wall 8 and which penetrate the rear side wall 8 axially. Furthermore, an air outlet 14 is provided which has a plurality of outlet openings 15 which are formed in the front side wall 7 and penetrate the front side wall 7 axially. A primary air path 16, indicated in FIGS. 1, 6 and 11 by arrows, leads from the primary inner inlet 12 to the air outlet 14 within the housing 4 or in an interior 17 of the housing 4.

The generator 1 which is presented here is also equipped with at least one secondary air inlet 18 which has a plurality of secondary air inlet openings 19 which are formed in the housing casing 6. In addition, a secondary air path 20 which is indicated by arrows and also leads from the respective secondary air inlet 18 to the air outlet 14 is formed in the housing interior 17.

The rotor 3 has a rotor shaft 21, pole bodies 22, 23 which are connected in a rotationally fixed fashion to the rotor shaft 21, and a rotor coil 24 which is held in a rotationally fixed fashion on the rotor shaft 21 by the pole bodies 22, 23. The rotor shaft 21 is mounted in a front rotor bearing 25 on the front side wall 7 and is also guided axially through the front side wall 7 in this front rotor bearing 25. The rotor shaft 21 is also mounted in a rear rotor bearing 26 on the rear side wall 8. A drive element 27, configured here as a belt wheel, is also attached in rotationally fixed fashion to the rotor shaft 21 on a side of the impeller wheel 9 facing away from the front side wall 7. For example, the generator 1 can as a result be connected in terms of drive into a belt drive of an internal combustion engine.

The stator 2 has a stator ring 28 and a stator winding 29. The stator ring 28 is ferromagnetic and can be formed by a stack of axially stacked, annular pieces of yoke metal. The stator winding 29 has a front winding end 55 axially projecting from the stator ring 28 towards the front side wall 7, and a rear winding end 56 axially projecting from the stator ring 28 towards the rear side wall 8. Furthermore, the generator 1 can have a rectifier 33 and a regulator 34 as well as further components of power electronics and/or control electronics.

During the operation of the generator 1, the rotor 3 rotates. Correspondingly, the impeller wheel 9 then also rotates. The rotating impeller wheel 9 generates, in the region of the outer openings 15 on the outer side 11 of the front side wall 7, a partial vacuum which causes air to be sucked in from the surroundings 30 of the generator 1. On the one hand, this generates a primary air flow 31 which enters the housing 4 through the primary air inlet 12, follows the primary air path 16 within the housing 4 and exits the housing 4 through the air outlet 14. At the same time, a secondary air flow 32 is also generated by said partial vacuum, said secondary air flow 32 entering the housing 4 through the respective secondary air inlet 18, following the secondary air path 20 in the housing 4 and also exiting the housing 4 through the air outlet 14.

While the primary air flow 31 along the primary air path 16 mainly cools the electronics in the region of the alternator 33, the rotor 3 and the front side wall 7 with the front rotor bearing 25 by picking up and carrying away heat, the secondary air flow 32 mainly brings about increased cooling of the stator winding 29, in particular of the front winding end 55 and/or of the rear winding end 56, of the stator ring 28 and of the front side wall 7 and therefore of the front rotor bearing 25.

Different variants for the positioning and configuration of the secondary air inlet 18 and of the secondary inlet openings 19 are shown in FIGS. 1 to 11 and will be discussed in more detail below. According to FIGS. 1 to 11, the secondary inlet openings 19 are preferably each configured or implemented in such a way that they have a radially outer inlet end 35 and a radially inner outlet end 36. It is noticeable here that the outlet end 36 is arranged axially offset with respect to the inlet end 35 in the direction of the front side wall 7. Direct radial through-flow of the casing 4 through such a secondary inlet opening 19 is therefore not possible. The necessary deflection of the flow as it flows through the respective secondary inlet opening 19 results in efficient protection of the housing interior 17 against the undesired penetration of impurities from the surroundings 30.

The generator 1 presented here is also distinguished by the fact that the housing 4 has a pot-shaped front part 37, which is denoted below as the front side pot 37. This front side pot 37 has a pot wall 38 which runs in the circumferential direction, and a pot floor 39 (which also can be named as pot bottom 39) at an axial end facing away from the rear side wall 8. The pot floor 39 of the front side pot 37 forms the front side wall 7. The pot wall 38 of the front side pot 37 forms a front longitudinal section 40 of the housing casing 6. The housing 4 also has a pot-shaped rear side part 41, referred to below as a rear side pot 41. The rear side pot 41 has a pot wall 42 which runs in the circumferential direction, and a pot floor 43 (which also can be named as pot bottom 43) which is located at an end of the rear side pot 41 facing axially away from the front side wall 7. The pot floor 43 of the rear side pot 41 forms the rear side wall 8. The pot wall 42 of the rear side pot 41 forms a rear longitudinal section 44 of the housing casing 6. The stator ring 28 is clamped in axially between the front side pot 37 and the rear side pot 41, as a result of which the stator 2 is secured axially, radially and in the circumferential direction on the housing 4. In particular, the front side pot 37 and the rear side pot 41 are screwed directly to one another. Corresponding clamping screws 45 can be seen in FIGS. 2, 3, 7 and 8, and partially also in FIGS. 6 and 11. In this context, the stator ring 28 is located axially between the front side pot 37 and the rear side pot 41 in such a way that the stator ring 28 forms a central longitudinal section 46 in the housing casing 6. The housing casing 6 is therefore preferably formed exclusively by the front section 40, the central section 46 and the rear section 44. The housing 4 is preferably also formed, in addition to the stator 2 and the stator ring 28, exclusively by the front side pot 37 and the rear side pot 41.

In the first embodiment shown in FIGS. 1 to 5, the secondary inlet openings 19 are formed exclusively on the front side pot 37. In the second embodiment shown in FIGS. 6 to 10, secondary inlet openings 19 are formed exclusively on the rear side pot 41. In the third embodiment shown in FIG. 11 the first and second embodiments are combined with one another, with the result that secondary inlet openings 19 formed on the front side pot 37 and secondary inlet openings 19 formed on the rear side pot 41 are provided. In addition, an embodiment is also generally possible in which secondary inlet openings 19 are formed on the stator ring 28, either exclusively or in combination with secondary inlet openings 19 which are formed in the front side pot 37 and/or on the rear side pot 41.

Figure 4:
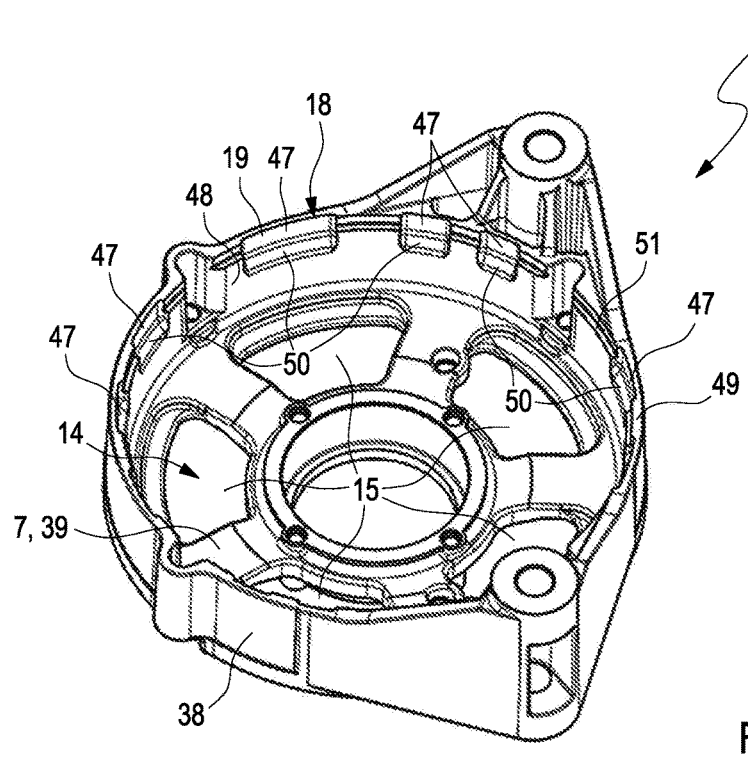
FIGS. 4 and 5 show isometric views of a front side pot of the generator in FIGS. 1 to 3 in different viewing directions.
Figure 5:
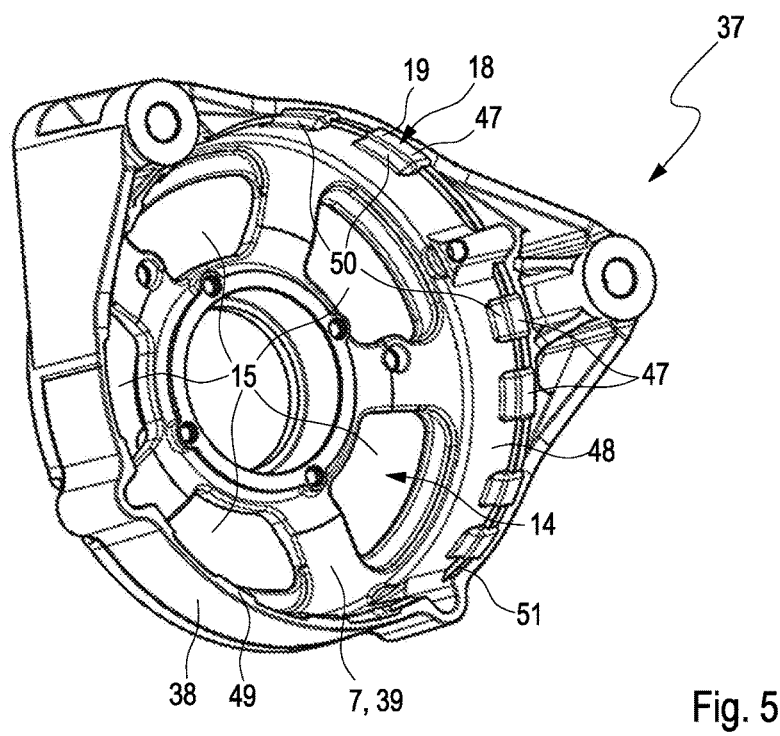
Figure 6:
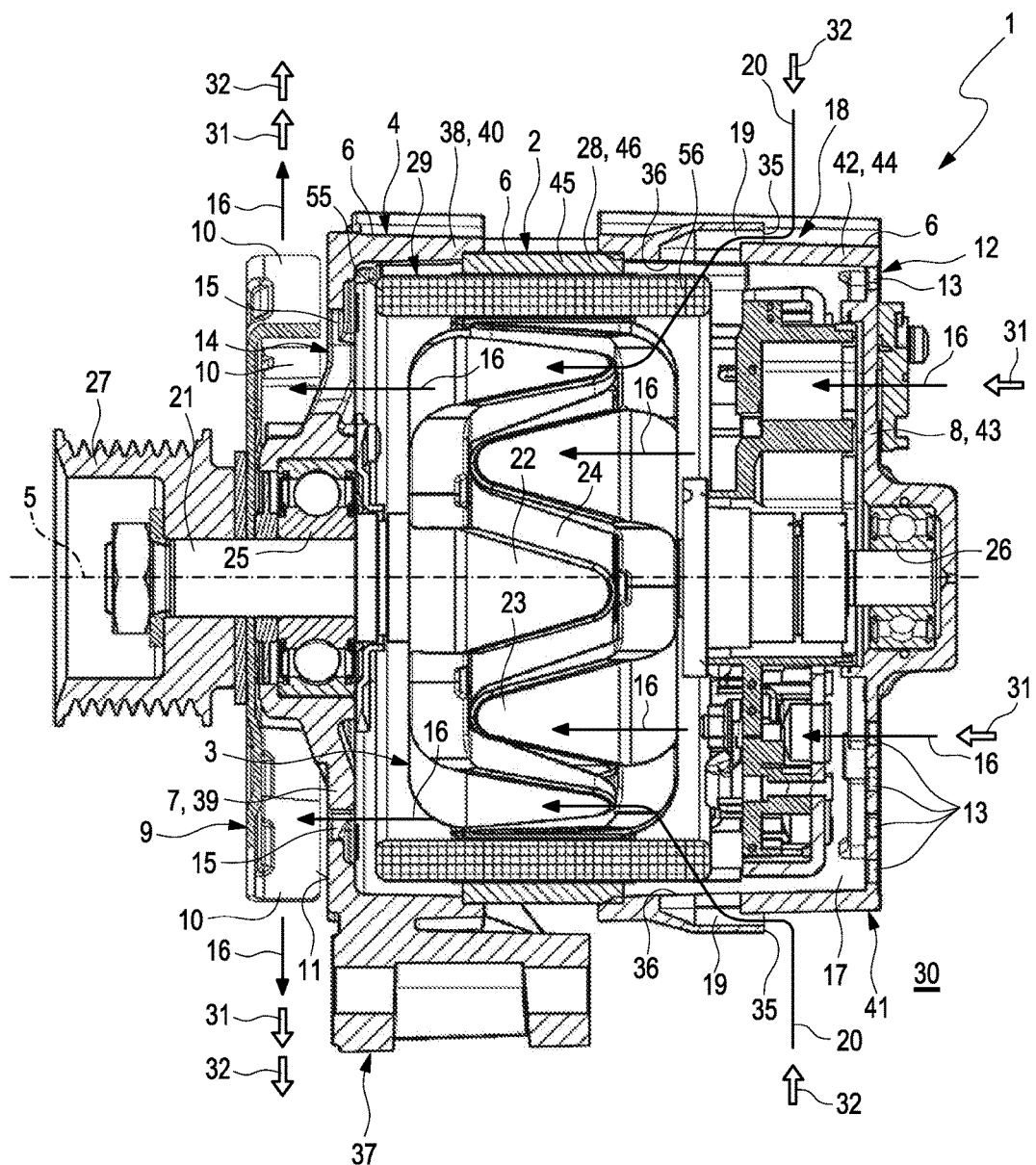
FIG. 6 shows an axial section through the electric generator according to a second embodiment.
Figure 7:
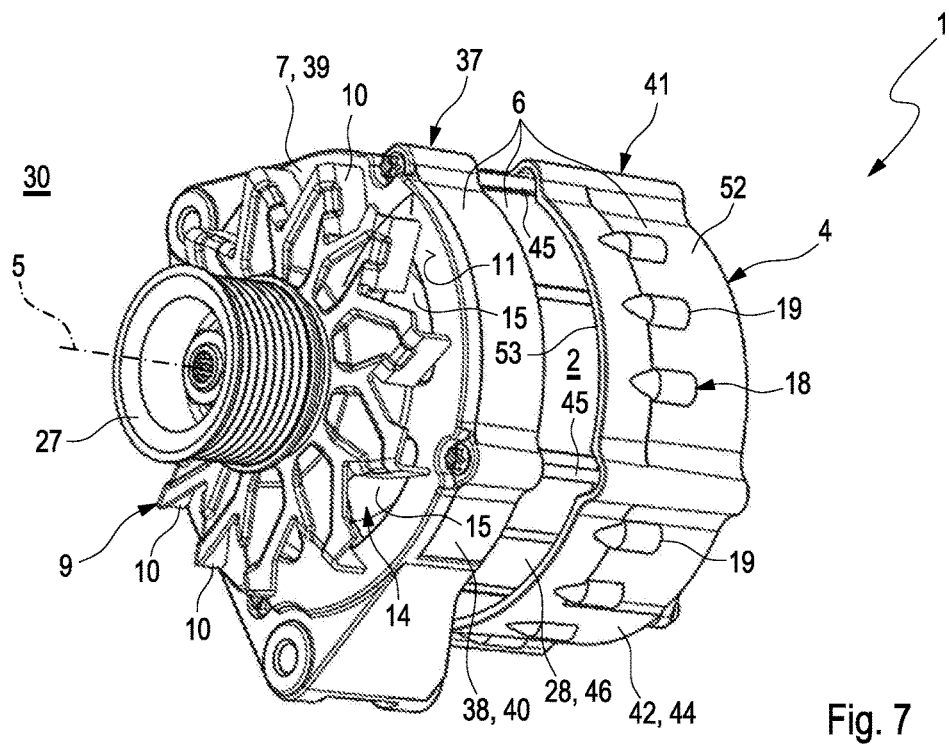
FIGS. 7 and 8 show isometric views of the generator from FIG. 6 in different viewing directions.
Figure 8:
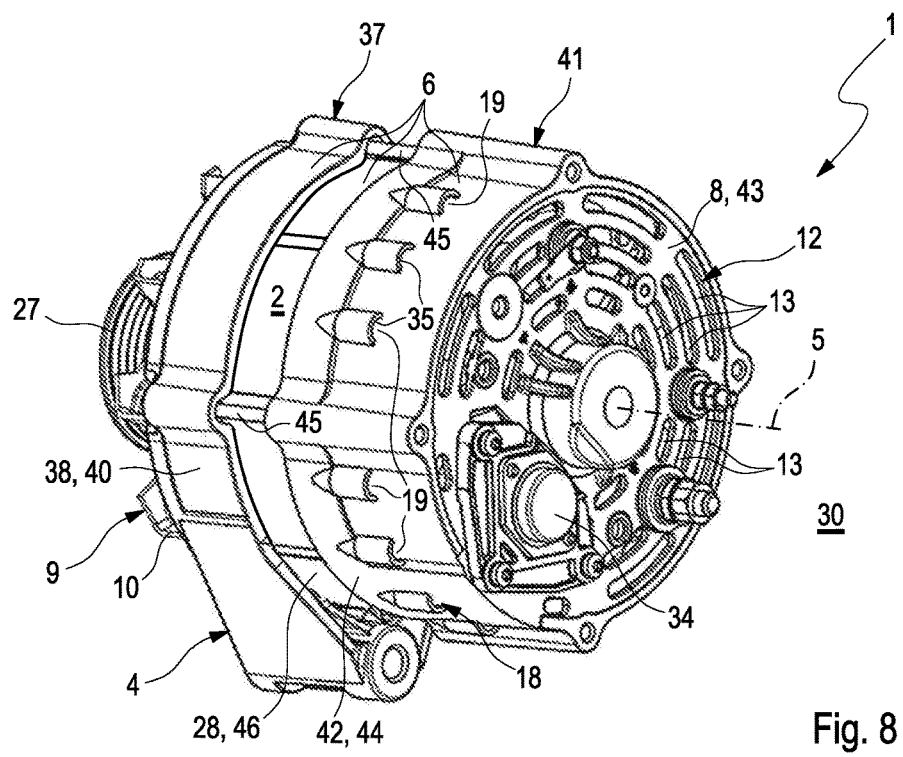
Figure 9:
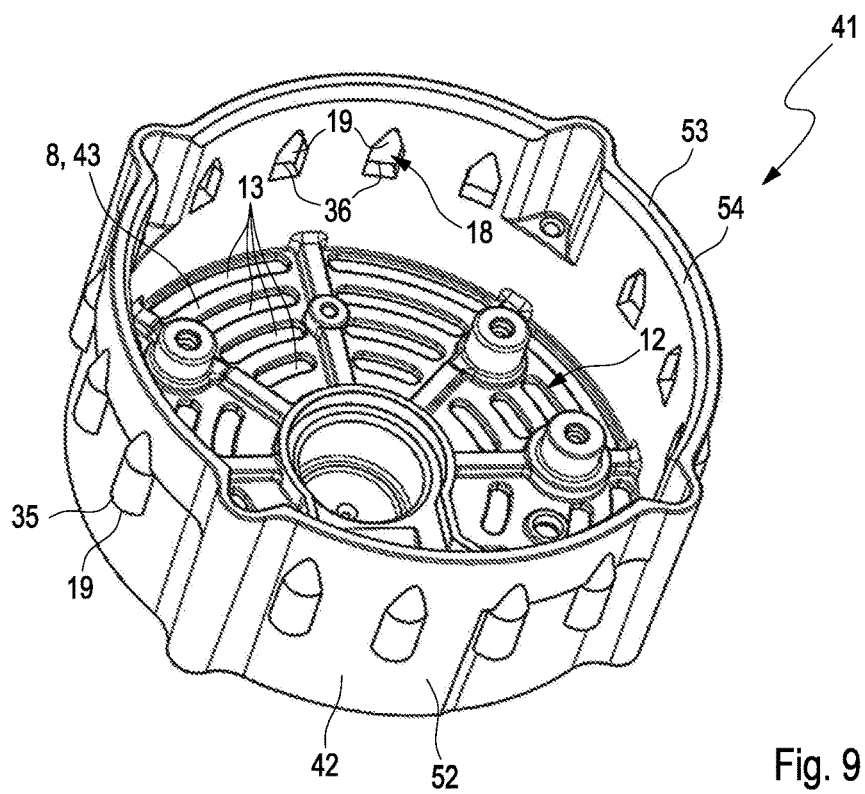
FIGS. 9 and 10 show isometric views of a rear side pot of the generator in FIGS. 6 to 8 from different viewing directions.
Figure 10:
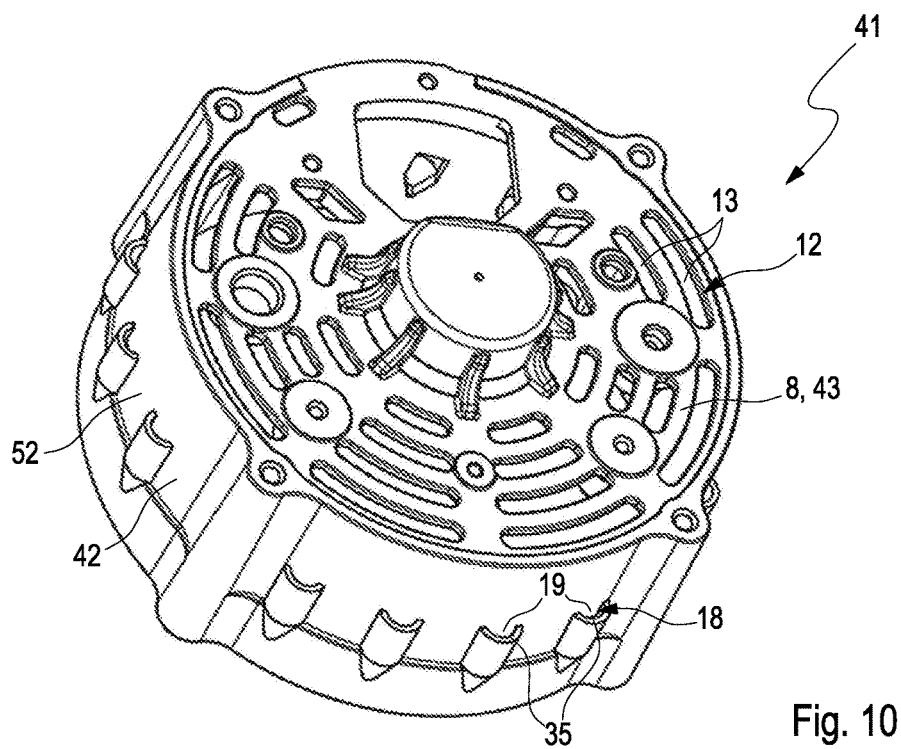

According to FIGS. 1 to 5 and 11, the secondary inlet openings 19 which are formed on the front side pot 37 can each be formed by a radial depression 47 which is formed on a radial inner side 48 of the pot wall 38 of the front side pot 37. The respective depression 47 extends here axially as far as into a front-side edge 49 of the pot wall 38, which edge 49 is located on a front side, facing away from the front side wall 7, of the pot wall 38. In the examples shown here, the respective depression 47 also has, placed apart axially from the edge 49 of the pot wall 38, a ramp 50 which rises towards the inner side 48 of the pot wall 38. The ramp 50 therefore provides a junction, favourable in terms of flow, for the axially oriented inlet end 35 at the edge 9 and the radially oriented outlet end 36 which is offset axially with respect to the inlet end 35. In FIGS. 4 and 5, an annular step 51 can be seen on which the stator ring 28 is supported axially on the front side pot 37 in the mounted state. In addition, in FIGS. 4 and 5 it can be seen that this annular step 51 is positioned axially on the pot wall 38 in such a way that in the circumferential direction it is guided through the secondary inlet openings 19 or interrupted in the circumferential direction by these secondary inlet openings 19. Therefore, in the region of this annular step 51, the respective secondary inlet opening 19 leads past a corresponding edge of the stator ring 28. In this region, intensive cooling, in particular of the stator winding 29, can therefore be implemented. According to a preferred embodiment which is realised in FIGS. 1 to 5 and 11, the secondary inlet openings 19 of this secondary inlet 18 are arranged axially at the housing casing 6 in such a position that the secondary air path 20 guides cooling air directly to the front winding end 55 in order to improve cooling of the stator winding 29 in the area of the front winding end 55.

In the embodiment shown in FIGS. 6 to 10 and 11, the secondary inlet openings 19 are, as mentioned, formed on the rear side pot 41. The respective secondary inlet opening 19 has, as above, an inlet end 35 and an outlet end 36. The respective inlet end 35 is arranged on a radial outer side 52 of the pot wall 42 of the rear side pot 41 and is open axially towards the rear side wall 8. The outlet end 36 penetrates the pot wall 42 radially and is spaced apart axially here for a front-side edge 53 of the pot wall 42. Furthermore, the respective inlet end 35 is spaced apart axially from the rear side wall 8. The rear side pot 41 also has an annular step 54 for axially supporting the stator ring 28. The positioning of the secondary inlet openings 19 can be seen to be selected here in such a way that they are spaced apart axially from this annular step 54. According to a preferred embodiment which is realised in FIGS. 6 to 10 and 11, the secondary inlet openings 19 of this secondary inlet 18 are arranged axially at the housing casing 6 in such a position that the secondary air path 20 guides cooling air directly to the rear winding end 56 in order to improve cooling of the stator winding 29 in the area of the rear winding end 56.

In the embodiment which can be seen in FIGS. 2 to 5, the secondary inlet openings 19 are distributed non-uniformly in the circumferential direction. In addition, the secondary inlet openings 19 have different circumferential dimensions in this embodiment. In other words, in this embodiment, there are various secondary inlet openings 19 which differ from one another in having respective different extents in the circumferential direction. In contrast to this, in the embodiment shown in FIGS. 6 to 10, the secondary inlet openings 19 are each configured in an identical fashion, wherein distribution which is as uniform as possible is also aimed at. Precise uniform distribution is, however, not provided here either. A varying portion of the secondary inlet openings 19 can be seen to result from the distribution of the screws 45 in the circumferential direction.

Figure 11:
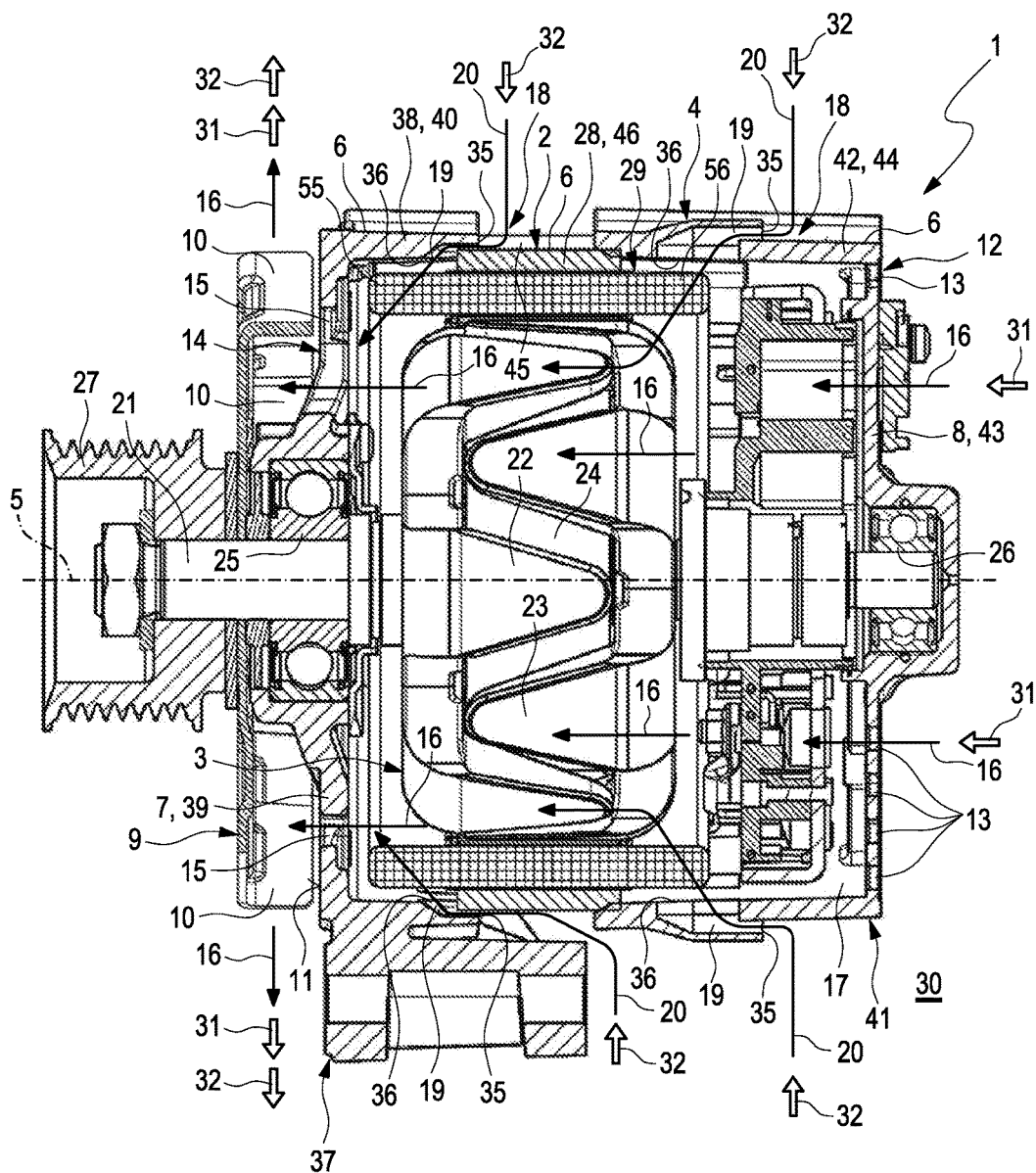
FIG. 11 shows an axial section through the electric generator according to a third embodiment.

In the third embodiment shown in FIG. 11 the first embodiment shown in FIGS. 1 to 5 and the second embodiment shown in FIGS. 6 to 10 are combined. So the housing casing 6 has, on the one hand, secondary inlet openings 19 which are arranged analogous to the first embodiment of FIG. 1 axially at the housing casing 6 in such a position that the secondary air path 20 guides cooling air directly to the front winding end 55 in order to improve cooling of the stator winding 29 in the area of the front winding end 55. Additionally, the housing casing 6 has, on the other hand, also secondary inlet openings 19 which are arranged analogous to the second embodiment of FIG. 6 axially at the housing casing 6 in such a position that the secondary air path 20 guides cooling air directly to the rear winding end 56 in order to improve cooling of the stator winding 29 in the area of the rear winding end 56.

In the embodiments of FIGS. 1 and 11 the outer inlet end 35 is aligned axially such that the primary air flow 31 enters the respective secondary inlet opening 19 essentially in the axial direction. Furthermore, said inner outlet end 36 is aligned radially such that the primary air flow 31 enters an interior 17 of the housing 4 in the axial and radial direction or essentially in the radial direction.

The respective secondary air inlet opening 19 defines a channel which extends at least partially parallel to the axis of rotation 5 of the rotor 3. Additionally or alternatively, the respective secondary air inlet opening 19 forms a curve in the range of 80° to 100°, and/or the respective secondary air inlet opening 19 has an outer inlet end 35 which is inclined in the range of 80° to 100°, preferably inclined essentially by 90°, to the inner outlet end 36.

Optionally, the respective secondary air inlet opening 19 has an outer inlet end 35 which is open only in the axial direction.

In the preferred embodiments of FIGS. 1 and 11 the respective secondary air inlet opening 19 assigned to the front winding end 55 is radially limited to the outside by the front side pot 37 and is radially limited to the inside by the stator ring 28. Additionally, or alternatively, the respective secondary air inlet opening 19 assigned to the front winding end 55 defines a channel which extends partially or completely between the front side pot 37 and the stator ring 28.

The respective secondary air inlet opening 19 assigned to the front winding end 55 can be realized by means of a depression 47 which axially overlaps a portion of the central longitudinal section 46.

According to a preferred embodiment said radial depression 47 forms at said front-side edge 49 an axially aligned outer inlet end 35 of the respective secondary inlet opening 19.

According to the preferred embodiment of FIG. 11 the respective secondary inlet opening 19 forms a channel guiding air from the inlet end 35 to the outlet end 36. Said channel has an axially extending inlet portion and a radially extending outlet portion. Said inlet portion of the channel fluidly connects the inlet end 35 to the outlet portion of the channel and extends at the outer side 52 of the pot wall 42, while the outlet portion of the channel fluidly connects the inlet portion of the channel with the outlet end 36 and radially penetrates the pot wall 42. Preferably, the respective secondary inlet opening 19 comprises a cover at the outer side 52 of the pot wall 42, wherein said cover radially covers the inlet portion of the channel.

In the embodiments presented in the FIG. 1 to lithe impeller wheel 9, which is arranged at the front side wall 7 and driven by the rotor 3, is the only impeller wheel 9 of the generator 1. Thus the generator 1 has only a single cooling fan, namely the impeller wheel 9.

The invention claimed is:

1. An electric generator for an internal combustion engine, comprising:
    a housing having a housing casing, which runs around in a circumferential direction, a front side wall, and a rear side wall;
    a radially outer stator rotatably arranged on the housing about an axis of rotation;
    a radially inner rotor arranged on the housing in a rotationally fixed manner;
    an axially outer impeller wheel arranged on an outer side of the front side wall facing axially away from the rear side wall, the impeller wheel being arranged in a rotationally fixed fashion on the rotor;
    a primary air inlet having a plurality of inlet openings formed in the rear side wall;
    a secondary air inlet having a plurality of secondary inlet openings formed in the housing casing;
    a plurality of outlet openings formed in the front side wall;
    a primary air path leading inside the housing from the primary air inlet to the air outlet;
    a secondary air path leading inside the housing from the secondary air inlet to the air outlet;
    wherein during operation of the electric generator, the impeller wheel rotates with the rotor and generates, on the outer side of the front side wall, in a region of the outlet openings, a partial vacuum which generates a primary air flow which enters the primary air inlet, follows the primary air path and exits through the air outlet; and
    wherein during operation of the generator, the partial vacuum generated by the impeller wheel when rotating generates a secondary air flow which enters through the secondary air inlet, follows the secondary air path and exits through the air outlet.

2. The electric generator according to claim 1, wherein each secondary inlet opening has a radially outer inlet end and a radially inner outlet end arranged axially offset with respect to the inlet end in a direction of the front side wall.

3. The electric generator according to claim 1, wherein:
    the stator has a stator ring and a stator winding;
    the housing has a front side pot with a pot floor that forms the front side wall and a pot wall that forms a front longitudinal section of the housing casing;
    the housing has a rear side pot with a pot floor that forms the rear side wall and a pot wall that forms a rear longitudinal section of the housing casing;
    the stator ring is connected to the front side pot and to the rear side pot;
    the stator ring forms a central longitudinal section of the housing casing axially between the front side pot and the rear side pot; and
    the housing is formed by the front side pot, the rear side pot and the stator ring.

4. The electric generator according to claim 3, wherein at least one secondary air inlet opening is formed on the front side pot by a depression axially overlapping a portion of the central longitudinal section.

5. The electric generator according to claim 4, wherein the secondary air inlet openings are adapted to guide air to a front winding end of the stator winding.

6. The electric generator according to claim 3, wherein each secondary inlet opening is formed on the front side pot by a radial depression on a radial inner side of the pot wall, the radial depression extending axially as far as into a front-side edge of the pot wall, facing away from the front side wall, said radial depression forming at said front-side edge an axially aligned outer inlet end of the respective secondary inlet opening.

7. The electric generator according to claim 6, wherein the radial depression has, spaced axially apart from the front-side edge (49) of the pot wall, a ramp which rises towards the radial inner side of the pot wall.

8. The electric generator according to claim 3, wherein at least one secondary inlet opening is formed on the rear side pot.

9. The electric generator according to claim 8, wherein the secondary air inlet openings are adapted to guide air to a rear winding end of the stator winding.

10. The electric generator according to claim 8, wherein each secondary inlet opening is formed on the rear side pot and has an inlet end, which is axially open towards the rear side wall on a radial outer side of the pot wall, and an outlet end, which is radially open towards an interior of the housing.

11. The electric generator according to claim 10, wherein at least one of:
    the outlet end is spaced apart axially from a front-side edge of the pot wall; and
    the inlet end is spaced apart axially from the rear side wall.

12. The electric generator according to claim 1, wherein at least one of:
    the primary air inlet is formed exclusively by the primary inlet opening formed in the rear side wall;
    the air outlet is formed exclusively by the outlet opening formed in the front side wall; and
    the secondary air inlet is formed exclusively by the secondary inlet openings formed in the housing casing.

13. The electric generator according to claim 1, wherein a plurality of the secondary air inlet openings is arranged distributed uniformly or non-uniformly in the circumferential direction.

14. The electric generator according to claim 1, wherein at least one of:
    the rotor has a rotor shaft mounted in a front rotor bearing on the front side wall and guided axially through the front side wall and mounted in a rear rotor bearing on the rear side wall; and
    the impeller wheel is connected in a rotationally fixed fashion to the rotor shaft of the rotor, axially between the front side wall and a drive element, wherein the drive element is connected in a rotationally fixed fashion to the rotor shaft.

15. The electric generator according to claim 2, wherein:
said outer inlet end is aligned axially such that the primary air flow enters the respective secondary inlet opening substantially in an axial direction; and
said inner outlet end is aligned radially such that the primary air flow enters an interior of the housing in an axial and radial direction or substantially in a radial direction.

16. The electric generator according to claim 1, wherein each secondary air inlet opening defines a channel which extends at least partially parallel to the axis of rotation of the rotor.

17. The electric generator according to claim 1, wherein each secondary air inlet opening forms a curve in a range of 80° to 100°.

18. The electric generator according to claim 1, wherein each secondary air inlet opening has an outer inlet end, and at least one of:
the outer inlet end is inclined in a range of 80° to 100° to an inner outlet end of the respective secondary air inlet opening; and
the outer inlet end is open only in an axial direction.

19. The electric generator according to claim 3, wherein at least one of:
each secondary air inlet opening is radially limited to the outside by the front side pot and is radially limited to the inside by the stator ring; and
each secondary air inlet opening defines a channel which extends partially or completely between the front side pot and the stator ring.

20. The electric generator according to claim 10, wherein:
each secondary inlet opening forms a channel guiding air from the inlet end to the outlet end;
said channel has an axially extending inlet portion and a radially extending outlet portion;
said inlet portion of the channel fluidly connects the inlet end to the outlet portion of the channel and extends at the outer side of the pot wall; and
the outlet portion of the channel fluidly connects the inlet portion of the channel with the outlet end and radially penetrates the pot wall.

21. The electric generator according to claim 20, wherein:
each secondary inlet opening includes a cover at the outer side of the pot wall; and
said cover radially covers the inlet portion of the channel.

* * * * *